July 2, 1968  H. L. RATLIFF, JR  3,390,587

AIRCRAFT CONTROL SYSTEM

Original Filed Sept. 8, 1964  5 Sheets-Sheet 1

INVENTOR

Harvey L. Ratliff Jr.

July 2, 1968  H. L. RATLIFF, JR  3,390,587
AIRCRAFT CONTROL SYSTEM
Original Filed Sept. 8, 1964  5 Sheets-Sheet 2
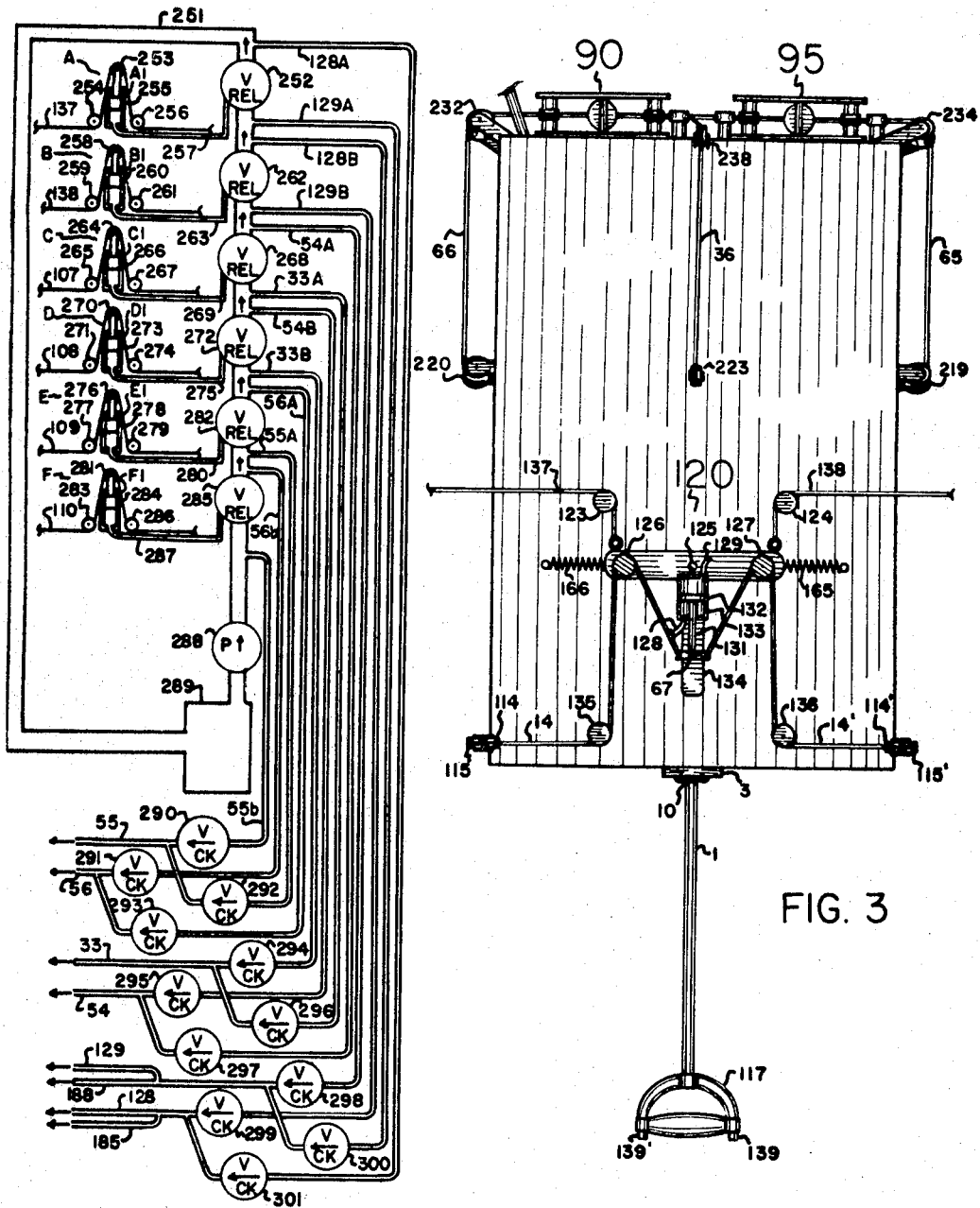
FIG. 3
FIG. 4
FIG. 5
INVENTOR
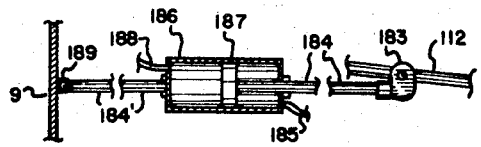

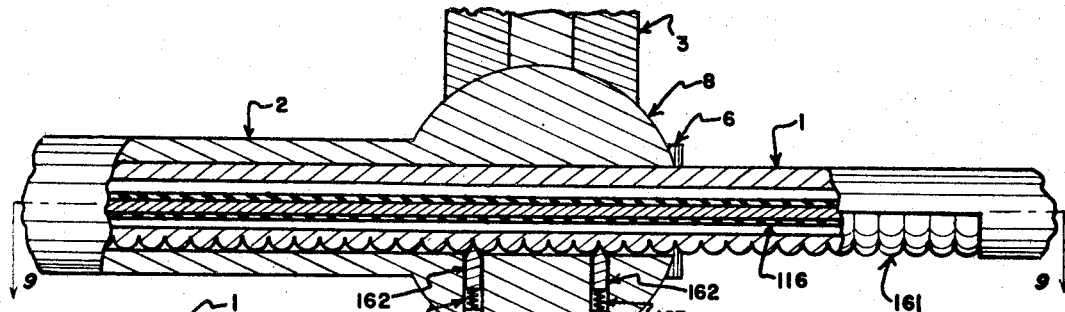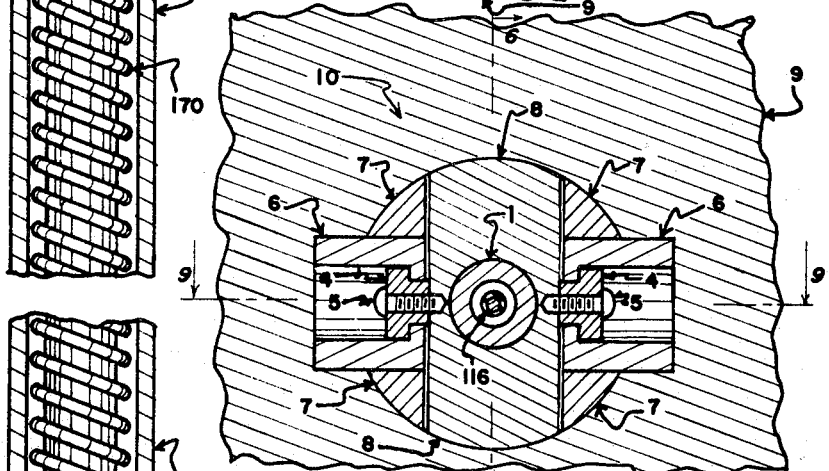

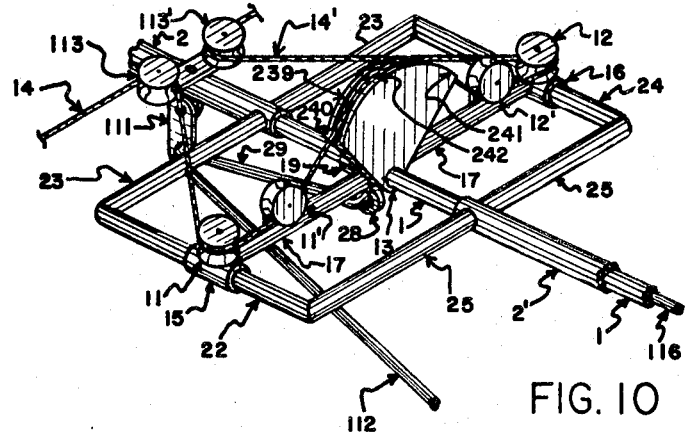
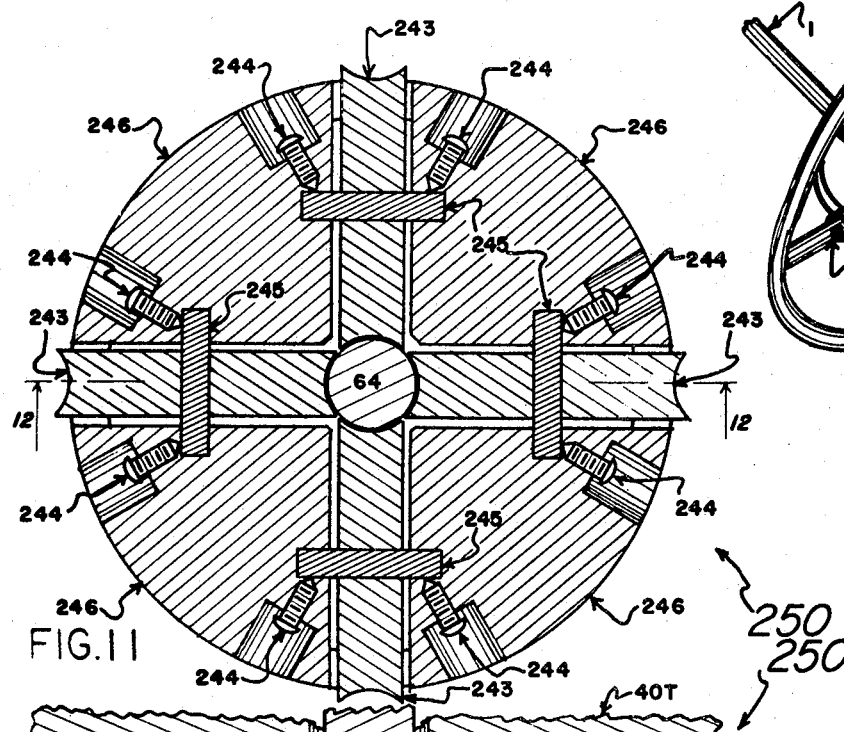
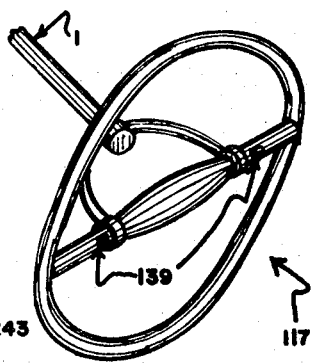
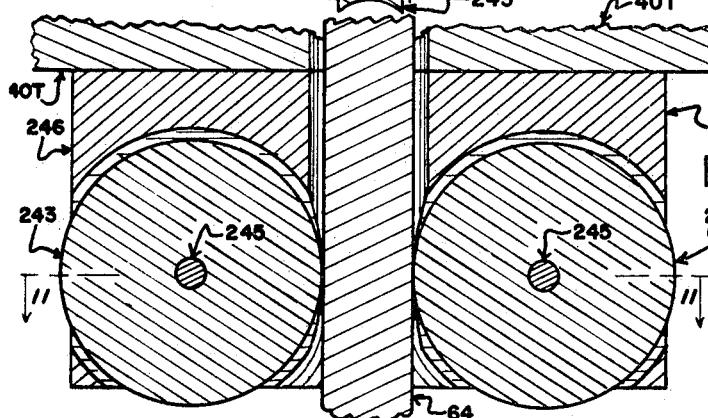
INVENTOR
Harvey L. Ratliff Jr.

United States Patent Office 3,390,587
Patented July 2, 1968

3,390,587
AIRCRAFT CONTROL SYSTEM
Harvey L. Ratliff, Jr., Amarillo, Tex., assignor to
Jetru Inc., Amarillo, Tex.
Continuation of application Ser. No. 394,698, Sept. 8,
1964. This application Sept. 2, 1966, Ser. No. 577,091
11 Claims. (Cl. 74—471)

ABSTRACT OF THE DISCLOSURE

A single lever control assembly which enables many controls from one lever. Axial displacement of the lever can control one mechanism such as the throttle of a fixed wing aircraft. Rotational movement of the lever can control a second mechanism such as the ailerons of a fixed wing aircraft. Lateral displacement of the lever about a pivot point in a first, say horizontal, plane can control a third mechanism. Lateral displacement of the lever about the pivot point in a second, say vertical, plane can control a fourth mechanism such as the elevators of a fixed wing aircraft. And manipulation of a switch or rheostat secured to the lever can control a fifth mechanism such as the flaps of a fixed wing aircraft.

---

This is a continuation application of my copending prior application Ser. No. 394,698, filed Sept. 8, 1964, now abandoned, which was a continuation-in-part application of and copending with my prior application Ser. No. 310,412, filed Sept. 20, 1963, now abandoned.

A brief summary of the invention is as follows:

This invention relates generally to control devices. Although it has virtually universal application (i.e. rotary wing aircraft, rockets etc.), the most contemplated application is to fixed wing aircraft.

In the past, in order for a pilot to have instantaneous control of yaw, pitch, roll, and throttle, he had to have one hand on the roll and pitch control wheel, the other hand on the throttle control, and both feet on the yaw control means. If it was necessary for him to do anything else, he had to leave one of these controls unattended.

It is the primary object of the present invention to not only make possible the control of yaw, pitch, roll, throttle and at least one other control by a single hand without leaving a single handle but also make this possible in a simple, reliable, economic manner which insures mechanical functions which provide as great force outputs as are needed at the control surfaces and as are provided by conventional control systems and communicates these force output requirements to said handle, It is also an object to provide a control system that will be very easy to learn because its operation is almost instinctive with every human being in that the cylindrical observable part (or the like) of the control system which is movable by hand is pointed upwardly to point the nose of the flight vehicle upwardly, pointed downwardly to point the nose of the flight vehicle downwardly, pointed rightwardly to point the nose rightwardly, pointed leftwardly to point the nose leftwardly, rolled rightwardly to roll the flight vehicle rightwardly, rolled leftwardly to roll the flight vehicle leftwardly, pushed inwardly along its own axis to increase the throttle and pulled outwardly along its own axis to decrease the throttle, and constructed such that at least one switch means controlling anything desired such as the flaps may be manipulated by the thumb of the hand holding the handle of the control system at the same instant said hand is controlling yaw, pitch, roll, and throttle. All of this time the other hand and both feet are completely free to manipulate any other controls needed or to just relax.

Another object is to set forth a control system which is workable in a simple, economic, reliable mechanical manner in small low speed fixed or rotary wing aircraft, but which in combination with hydraulic or electro-servo systems is adaptable to virtually any known type of flight vehicle; thereby saving the expense in time and money required to train pilots different control systems for different types of flight vehicles.

It is still a further object of the present invention to not only provide the pilot a sense of the attitude of the vehicle by observing the angular disposition of the observable portion of the control system, but also to provide force characteristics of the control system which will give the pilot still a greater sense of the attitude of the flight vehicle.

Other objects and advantages of my invention will become more apparent from a study of the following description taken with the accompanying drawings wherein:

FIG. 3 is a bottom view of the control unit of the present invention.

FIG. 4 is a diagrammatic view of the system for transmitting any force characteristics needed to the control surfaces of the flight vehicle embodied in the control unit of the present invention.

FIG. 5 is a partially sectional view of the tension compensating element.

FIG. 6 is a side partially sectional view of a contemplated form of joint element 10 taken along line 6—6 of FIG. 7 looking in the direction of the arrows.

FIG. 7 is a front sectional view of said contemplated form of joint element 10 taken along line 7—7 of FIG. 9 looking in the direction of the arrows.

FIG. 8 is a top view partially in section showing the inside of 2' in a contemplated form of the invention.

FIG. 9 is a top view partially in section of said contemplated form of joint element 10 taken along line 9—9 of FIGS. 6 and 7 looking in the direction of the arrows.

FIG. 10 is an isometric drawing showing a contemplated modified form of element 26.

Figure 1:
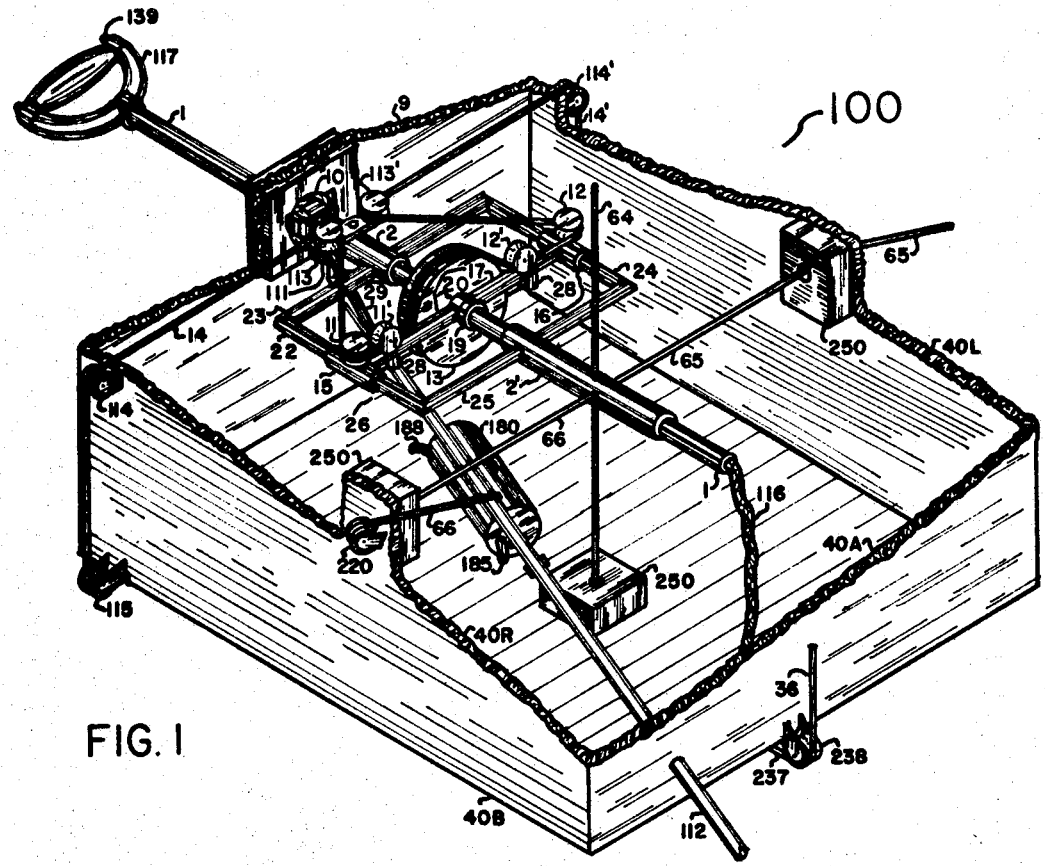
FIG. 1 is a partially cut away isometric drawing showing the control system of the present invention looking from the upper rearward right (considered from the orientation of the pilot).

FIG. 11 is a plan sectional view (taken along 11—11 of FIG. 12 looking in the direction of the arrows) of an element 250 used in FIG. 1.

FIG. 12 is a side sectional view (taken along 12—12 looking in the direction of the arrows) of the element 250 of FIG. 11.

FIG. 13 is an isometric drawing showing a contemplated modified version of handle 117.

Figure 14:
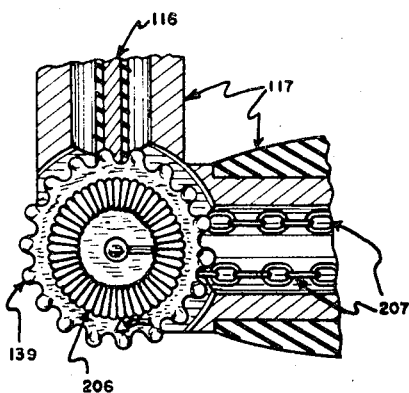

FIG. 14 is a sectional view illustrating a contemplated form of switch means 139.

Figure 15:
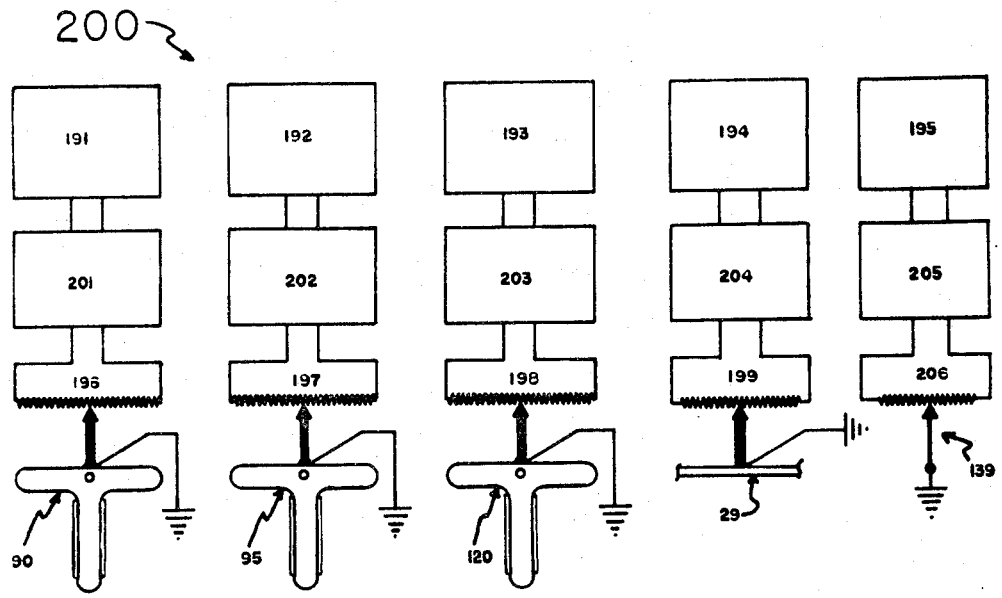

FIG. 15 is a schematic drawing diagrammatically illustrating the universal applicability of the present invention.

Referring more particularly to the drawings reference is made to FIG. 1 showing the inside of control unit 100. Long cylindrical element 1 is rigidly secured to handle 117 (which can be like any well known steering or aileron activating wheel or the like) on one end and passes therefrom through joint element 10, cylindrical element 2, control element 26, cylindrical element 2', and out beyond cylindrical element 2' far enough that when sheave 13 is as close to joint 10 as possible the other end of 1 is still beyond 2' so that conduit 116 never rubs on 2'.

Joint 10 is constructed such that element 1 may be rotated about its own axis, about a first axis which is perpendicular to 1 within 10, about a second axis which is perpendicular to said first axis and moved back and forth along its own axis, such that element 2 is held from rotation about its own axis or movement along its own axis but is forced to rotate with element 1 about said first and second axes.

Reference is now made to FIGS. 6, 7, and 9. The socket element of joint 10 is made up of elements 3 and 9. It is contemplated that element 8 is rigidly secured to element 2, is shaped like a sphere which has its right end sliced off and its left end sliced off, and is as wide as the outside diameter of element 2. Element 8 has a cylindrical hole therethrough which has a diameter slightly greater than the diameter of element 1 and which has an axis congruent with the axis of element 2 thereby allowing 1 to slide in and out of 8. Bearings 4 are made free to rotate within elements 6 in a well known manner and secured to element 8 in a well known manner (such as by screws 5) thereby allowing 8 and thereby 1 and 2 to rotate about the bearing axis which is perpendicular to the axis of elements 1 and 2. Elements 7 are secured to elements 6 in a well known manner such as to not impede the rotation of element 8 about said bearing axis and have the same radius of curvature as element 8 to thereby present the appearance of a continual sphere above and below elements 6. As shown in FIGS. 7 and 9 elements 6 protrude beyond the spherical surface of elements 7 and 8 and the socket made up of elements 3 and wall 9 is constructed such that it allows joint 10 and thereby element 8 and thereby elements 1 and 2 to rotate about one axis which is perpendicular to said bearing axis (this would be the axis of FIG. 9 which is perpendicular to the plane of the sheet of paper passing through the center of joint 10) and to be held from rotation about the other axis which is perpendicular to both said bearing axis and said one axis (this would be the axis of FIG. 9 which is within the plane of the sheet of paper passing through the center of joint 10). The inside diameter of element 2 is made slightly greater than the outside diameter of element 1. It may be seen that nothing about element 8 or element 2 will keep element 1 from being rotated about its own axis or moved along its own axis without moving element 8 and thereby without moving element 2. Impeding means 161, 162, 163, and 164 of FIG. 6 do not keep element 1 from being rotated about its own axis or moved along its own axis and will be described in greater detail later. It can therefore be seen that the bearing axis corresponds to the first axis of the paragraph immediately preceding. There are of course other ways of arranging joint 10 in compliance with said immediately preceding paragraph which are obvious herefrom. The point being that there are three axes, the axis of element 1, an axis which is always perpendicular to the axis of 1, and an axis which is always perpendicular to both these axes, one of the two latter axes rotating with 1 with reference to element 9 and the other being fixed with reference to element 9.

Left and right elements 23 (the left element 23 as seen by the pilot is secured to 24) are rigidly secured to element 2 as shown in FIG. 1 and FIG. 10 at their inside ends and to elements 24 and 22 at their outside ends. The other ends of elements 24 and 22 respectively are rigidly secured to the outside ends of left and right elements 25 which are rigidly secured at their inside ends to element 2'. Shoulder 19 and sheave or element 13 are each rigidly secured to element 1 as shown in FIG. 1 (shoulder 19 could be in front of element 13 as shown in FIG. 10). Element 20 is rotatably mounted around element 1 between elements 13 and 19. Left and right elements 17 are rigidly secured at their inside ends to element 20 and at their outside ends to elements 16 and 15 respectively. Elements 16 and 15 are mounted around elements 24 and 22 respectively such that they are free to move along the axis of 24 and 22 respectively.

Figure 2:
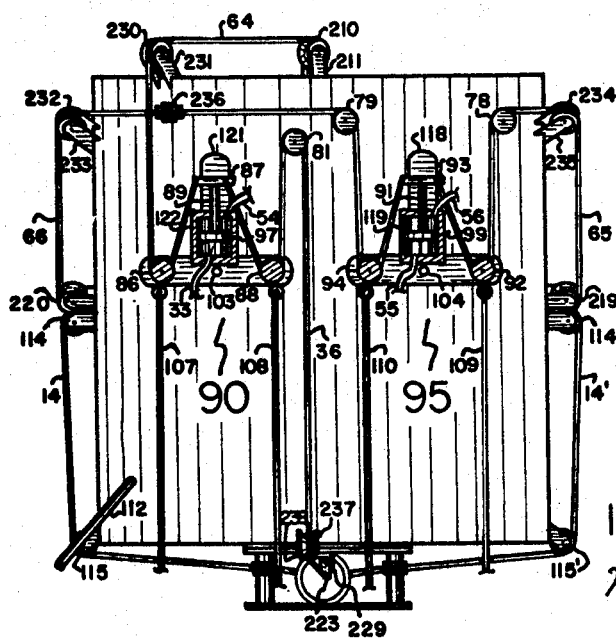
FIG. 2 is a rear view of the control unit of the present invention.

Sheaves 11 and 12 are rotatable secured to elements 15 and 16 respectively as shown in FIG. 1. Also sheaves 11' and 12' are rotatably secured by a means which is obscured from vision by the sheaves 11' and 12' to right and left elements 17 respectively as may be seen in FIG. 1 and FIG. 10. Sheaves 113, 113' (supported upon element 2 as shown), 114, 114', 115, 115', 135, 136, 123 and 124 are rotably secured to 40R, 40L, 40R, 40L, 40B, 40B, 40B, and 40B respectively as shown in FIGS. 1, 2 and 3. Also sheaves 210, 230, 219, 234, 220, 232, 223, 238, 78, 79, 81 and 236 are rotatably secured to 211, 231, 40L, 235, 40R, 233, 40B, 237, 40A, 40A, 40A, and 40A respectively as shown in FIGS. 1, 2 and 3.

Cable 14 is secured within the rearward groove 242 of sheave or element 13 at 241 wrapped over the top of sheave 13, threaded under sheave 11', around sheave 11, around sheave 113, around sheave 114 and around 115 (see FIG. 2) as shown in FIG. 1 and FIG. 10. From sheave 115 cable 14 is threaded around sheave 135, around sheave 126 (which is rotatably secured to base plates 134 of tension maintaining control element 120), and secured to element 67 as shown in FIG. 3.

Cable 14' is secured within the forward groove 239 of sheave or element 13 at 240 threaded over the top of sheave 13, threaded under sheave 12', around sheave 12, around sheave 113', around sheave 114' (as shown in FIG. 1) around 115', around sheave 136, around sheave 127 and secured to element 67 (as shown in FIG. 3).

Cable 65 is secured to the left side of element 2' as shown in FIG. 1. From this point it is threaded through a jump roof sheave arrangement 250 (i.e. see FIG. 19 of No. 310,412, filed Sept. 20, 1963, entitled "An Aircraft Control System," now abandoned), around sheave 219, around sheave 234, around sheave 78, around sheave 92 and secured to element 93, sheave 92 being rotatably secured to base plates 118 of tension maintaining control element 95.

Cable 66 is secured to the right side of element 2' as shown in FIG. 1. From this point it is threaded through right jump proof sheave arrangement 250, around sheave 220, around sheave 232, over sheave 236, around sheave 79, around sheave 94 and secured to element 93 as shown in FIG. 2, sheave 94 being rotatably secured to base plates 118 of tension maintaining element 95.

Cable 64 is secured to the top side of element 2' as shown in FIG. 1. From this point it is threaded through top jump proof sheave arrangement 250 (not shown), around sheave 210, around sheave 230, around sheave 86 and secured to element 87 as shown in FIG. 2, sheave 86 being rotatably secured to base plates 121 of tension maintaining control element 90.

Cable 36 is secured to the bottom side of element 2' as shown in FIG. 1. From this point it is threaded through bottom jump proof sheave arrangement 250, around sheave 223, around sheave 238, around sheave 81, around sheave 88 and secured to element 87 as shown in FIG. 2, sheave 88 being rotatably secured to base plates 121 of tension maintaining control element 90.

Left and right elements 28 as shown in FIG. 1 are rigidly secured to left and right elements 17 (or element 28 is secured to 19 as shown in FIG. 10). Left and right elements 29 are secured at their rearward ends to left and right elements 28 and at their forward ends to the forward end of element 2 and rod or mechanical actuator 112 such that elements 28 and 112 are rigidly secured together and allowed to move back and forth parallel to the axis of element 2 but held from all other movement by runner 111 under 2. Rod 112 controlling the throttle in a well known manner in the arrangement of FIG. 1.

In the arrangement of FIG. 10, element 29 is secured at its rearward end to element 28 and its forward end to element 111 which is rotatably secured to element 2 as shown in FIG. 10. Rod 112 is secured to element 111 at substantially the same point as 29 and therefore moves with 29 such that when 1 is pushed into 10, 28 is made to move forward making making 29 and therefore 112 move forward. Correspondingly, when 1 is pulled outwardly from 10, (i.e. rearwardly), 112 is moved rearwardly from the null position shown in FIG. 10.

Cables 137 and 138 are threaded such as to control the roll characteristics of the flight vehicle in response to movements of element 120 in a known manner i.e. see FIG. 9 of said No. 310,412, filed Sept. 20, 1963, entitled "An Aircraft Control System." Also cables 107 and 108 are threaded such as to control the pitch characteristics of the flight vehicle in response to movements of element 90 and cables 109 and 110 are threaded such as to control the yaw characteristics of the flight vehicle in response to movements of element 95 in a known manner i.e. see said FIG. 9.

Reference is now made to FIGS. 11 and 12. It is contemplated that element 250 is used in conjunction with cables 36, 64, 66, and 65 as shown in FIG. 1; however, for the sake of illustration in FIGS. 11 and 12 it is shown in conjunction with cable 64. Sheaves 243 are made free to rotate about bearings 245 in a well known or obvious manner as shown in FIGS. 11 and 12. Bearings 243 are made to be supported by base 246 in a well known or obvious manner. Base 246 is secured to any one of walls 40T, 40B, 40L or 40R in a well known or obvious manner. Means (such as screws 244) are provided to loosen sheaves 243 in order to thread the desired cable (such as cable 64) and to thereafter force sheaves 243 firmly against said desired cable (such as cable 64). Two of the sheaves 243 are placed such (when element 250 is secured to a wall such as 40R) that their axes are in the same direction as the axes of the sheaves used in 114 and two of the sheaves 243 are placed such that their axes are perpendicular thereto.

Tension sensing elements A, B, C, D, E, and F are threaded into cables 137, 138, 107, 108, 109, and 110 respectively. Cable 137 is threaded around sheave 256, around sheave 253 and around sheave 254 as shown in FIG. 4. The greater the tension in cable 137, the greater the force exerted by piston 255 upon the fluid within chamber A1 and therefore the greater the pressure of the fluid in tube 257. The greater the pressure of the fluid in tube 257 the greater the throttling effect of pressure relief valve 252 and therefore the greater the pressure drop across 252, if fluid is passing therethrough. Pump 288 forces fluid from reservoir 289 through valves 285, 282, 272, 268, 262 and 252, through conduit 251 back to reservoir 289.

Cable 138 is threaded around sheave 261, around 258 and around 259 as shown in FIG. 4. The greater the tension in cable 138, the greater the force exerted by piston 260 upon the fluid within chamber B1 and therefore the greater the pressure of the fluid in tube 263. The greater the pressure of the fluid in tube 263 the greater the throttling effect of pressure relief valve 262 and therefore the greater the pressure drop across valve 262.

In a similar manner elements C1, 267, 264, 265, 266, and 269 cooperate together to make the pressure drop across valve 268 proportional to the tension in cable 107; elements D1, 274, 270, 271, 273 and 275 cooperate together to make the pressure drop across valve 272 proportional to the tension in cable 108; elements E1, 279, 276, 277, 278 and 280 cooperate together to make the pressure drop across valve 282 proportional to the tension in cable 109; and elements F1, 286, 281, 283, 284 and 287 cooperate together to make the pressure drop across valve 285 proportional to the tension in cable 110.

The pressure within tubes 129B, 54B, 56B and 128B is amplified in a well known manner (i.e. see the Aug. 25, 1964, issue of the Wall Street Journal pages 1 and 12) such that when the pressure drop across 252 equals the pressure drop across 262 (that is the tension in 137 equals that in 138), the pressure entering check valve 301 equals the pressure entering check valve 299; when the pressure drop across 268 equals the pressure drop across 272 (that is the tension in 107 equals that in 108), the pressure entering check valve 297 equals the pressure entering check valve 295, and when the pressure drop across 282 equals the pressure drop across 285 (that is the tension in 109 equals that in 110), the pressure entering check valve 293 equals the pressure entering check valve 291. Similarly, when the tension in 137 equals that in 138, the pressure entering check valve 300 equals that entering check valve 298; when the tension in 107 equals that in 108, the pressure entering check valve 296 equals that entering check valve 294 and when the tension in 109 equals that in 110, the pressure entering valve 292 equals that entering check valve 290.

Due to check valves 298, 299, 300 and 301 the pressure difference between the fluid within tube 129 and that within tube 128 is proportional to the tension within cable 137 or 138 whichever tension is the greatest. Similarly, due to check valves 294, 295, 296 and 297 the pressure difference between the fluid within tube 54 and that within tube 33 is proportional to the tension within cable 107 or 108 whichever tension is the greatest, and due to check valves 293, 292, 291 and 290 the pressure difference between the fluid within tube 56 and that within tube 55 is proportional to the tension within cable 109 or 110 whichever is the greatest. Of course the pressure within 188 equals that of 129 and the pressure within 185 equals that within 128. If desired the pressure difference between the fluid within tubes 55 and 56, 33 and 54, and 129 and 128 may be amplified by method described hereinabove or these pressure differences may be used in more conventional manners to keep the tension in cables 14 and 14' commensurate with the tension within either 137 or 138 (whichever is the greatest), to keep the tension in cables 36 and 64 commensurate with the tension within either 107 or 108 (whichever is the greatest) and to keep the tension in cables 66 and 65 commensurate with the tension within either 109 or 110 (whichever is the greatest).

Piston 132 fits snugly within cylinder 133 (see FIG. 3) such that fluid may not pass from one side of 132 to the other. Cylindrical chamber 133 is fluid tight allowing rod 131 (which is rigidly connected to piston 132 at one end and to element 67 at the other end) to reciprocate back and forth. The size of piston 132 is chosen such that for any pressure difference between the fluid in tube 128 and the fluid in tube 129, the tension in cables 14 and 14' is held slightly greater than the tension in either cable 137 or 138 whichever is the greatest. In this manner whatever force is required for proper roll control may be exerted by the pilot (not just minimum force outputs), but any required force output.

Piston 97 fits snugly within cylinder 122 (see FIG. 2) such that fluid may not pass from one side of 97 to the other. Cylindrical chamber 122 is fluid tight allowing rod 89 (which is rigidly connected to piston 97 at one end and to element 87 at the other end) to reciprocate back and forth. The size of piston 97 is chosen such that for any pressure difference between the fluid in tube 54 and the fluid in tube 33, the tension in cables 64 and 36 is held slightly greater than the tension in either cable 107 or 108 whichever is the greatest. In this manner whatever force is required for proper pitch control may be exerted by the pilot not just minimum force outputs, but any required force output.

Also piston 99 fits snugly within cylinder 119 such that fluid may not pass from one side of 99 to the other. Cylindrical chamber 119 is fluid tight allowing rod 91 (which is rigidly secured to piston 99 at one end and to element 93 at the other end) to reciprocate back and forth. The size of piston 99 is chosen such that for any pressure difference between the fluid in tube 55 and the fluid in tube 56, the tension in cables 65 and 66 is held slightly greater than the tension in either cable 109 or 110 whichever is the greatest. In this manner whatever force is required for proper yaw control may be exerted by the pilot not just minimum force outputs, but any required force output.

Further piston 187 fits snugly within cylinder 186 of tension compensating elements 180 (see FIGS. 1 and 5) such that fluid may not pass from one side of 187 to the other. Cylinder 186 is fluid tight allowing rod 184 (which is rigidly secured to piston 187 at one end, to element 183 at the other) to reciprocate back and forth. The size of piston 187 is chosen such that the force exerted by it is in equilibrium with the force exerted by piston 132 of FIG. 3. As stated before the pressure in 188 is the same as that in 129 and the pressure in 185 is the same as that in 128. Element 183 is secured to rod 112 as shown, element 184' is secured at one end to cylinder 187 and at the other end to element 189 which is secured to front member 9, as shown in FIG. 5. It may clearly be seen that the pressure difference between the fluid in tube 188 (and therefore on the front side of piston 187) and the fluid in tube 185 (and therefore on the rear side of piston 187) is equal to or proportional to the pressure difference between the fluid in tube 129 and the fluid in tube 128.

It may now be seen that when handle 117 is moved downwardly and therefore element 1 is pointed upwardly, element 2' is moved upwardly, thereby placing a counter clockwise torque on element 90 (as viewed from the rear) which causes element 90 to rotate counterclockwise about 103 because the pressure difference in chamber 122 is great enough regardless of the tension in cable 107 or 108 that the pitch control actuating system will yield before piston 97 will yield (for the reasons described hereinabove). Also when handle 117 is moved downwardly and therefore element 1 is pointed upwardly, the same amount of tension is placed upon cable 66 as is placed upon cable 65, thereby forcing piston 99 downwardly because no torque is placed on element 95 and piston 99 will yield relatively easy (because the tension in 109 and 110 is relatively low) and for practical purposes pin 104 will not yield at all. It is here pointed out that in this position of handle 117, the pressure difference within chamber 119 biases element 90 back to its null position.

Similarly when handle 117 is moved upwardly and therefore element 1 is pointed downwardly, element 90 rotates clockwise and no torque is placed upon element 95 and piston 99 is forced downward, element 90 being biased toward its null position.

When handle 117 is moved leftwardly and therefore element 1 is pointed rightwardly, element 2' is moved rightwardly, thereby placing a counterclockwise torque upon element 95 (as viewed from the rear) which causes element 95 to rotate counterclockwise about 104 because the difference in pressure within chamber 119 is great enough regardless of the tension in cable 109 or 110, that the yaw control actuating system will yield before piston 99 will yield. Also when handle 117 is moved leftwardly and therefore element 1 is pointed rightwardly, the same amount of tension is placed upon cable 64 as is placed upon cable 36, thereby forcing piston 97 downwardly because no torque is placed on element 90 and piston 97 will yield relatively easy (because the tension in 107 and 108 is at minimum) and for practical purposes pin 103 will not yield at all. It is here pointed out that in this position of handle 117, the pressure difference within chamber 122 biases element 95 back to its null position.

Similarly when handle 117 is moved rightwardly and therefore element 1 is pointed leftwardly, element 95 rotates clockwise and no torque is placed upon element 90 and piston 97 is forced downward, element 95 being biased toward its null position.

When handle 117 is moved downwardly and leftwardly and therefore element 1 is pointed upwardly and rightwardly, element 2' is moved upwardly and rightwardly, thereby causing elements 90 and 95 to rotate counterclockwise and pistons 99 and 97 are forced downwardly, thereby making the pitch of the flight vehicle upward and the yaw rightward.

When handle 117 is moved upwardly and rightwardly and therefore element 1 is pointed downwardly and leftwardly, element 2' is moved downwardly and leftwardly, thereby causing elements 90 and 95 to rotate clockwise and pistons 99 and 97 are forced downwardly, thereby making the pitch of the flight vehicle downward and the yaw leftward.

When handle 117 is moved downwardly and rightwardly and therefore element 1 is pointed upwardly and leftwardly, element 2' is moved upwardly and leftwardly thereby causing element 90 to rotate counterclockwise and element 95 to rotate clockwise; pistons 99 and 97 being forced downwardly, thereby making the pitch of the flight vehicle upward and the yaw leftward.

When handle 117 is moved upwardy and leftwardly and therefore element 1 is pointed downwardly and rightwardly, element 2' is moved downwardly and rightwardly thereby causing element 90 to rotate clockwise and element 95 to rotate counterclockwise; pistons 99 and 97 being forced downwardly, thereby making the pitch of the flight vehicle downward and the yaw rightward.

It may now be seen that when handle 117 is rotated about the axis of 1 in a clockwise direction, element 1 is rotated in a clockwise direction about its own axis and therefore sheave 13 is rotated in a clockwise direction about the axis of 1 while elements 17 are held from rotation about the axis of 1; therefore (as viewed from the bottom) a clockwise torque is placed upon element 120 which causes element 120 to rotate clockwise about pin 125 because the pressure difference in chamber 133 is held proportionally strong enough regardless of the tension in 137 or 138 that the roll control actuating system will yield before piston 132 will yield.

Obviously, therefore, when handle 117 is rotated about the axis of 1 in a counterclockwise direction, element 120 is rotated in a counterclockwise direction (as viewed from the bottom) about pin 125. Springs 166 and 165 bias element 120 back toward its null position.

When handle 117 is moved inwardly along the axis of 1, piston 132 yields easily (because of the counterbalancing force caused by the pressure difference within chamber 186) and piston 132 moves toward pin 125 and no rotation of 120 results since no torque is placed upon element 120 and since for practical purposes pin 125 will not yield at all. Also rods 29 force rod 112 forwardly (as viewed by the pilot) to increase the throttle.

When handle 117 is moved outwardly along the axis of 1, piston 132 moves away from pin 125 to keep cables 14 and 14' tight because of the pressure difference within chamber 133 and no rotation takes place since no torque is placed upon element 120; also rods 29 force rod 112 rearwardly (as viewed by the pilot) to decrease the throttle.

Of course if it is desired to make the force required by the pilot to control yaw or pitch less without using conventional hydraulic power systems or servo-systems, counterbalancing chambers could be devised which work in conjunction with 119 and 122 in a manner obvious from the relationship of chamber 133 to chamber 186.

It may now be seen that the hereinabove described control system is simple, reliable, economic and insures force outputs as great as are attainable with conventional control systems.

It is very simple to learn because its operation is instinctive in that the observable part 1 of the control system is pointed upwardly (by moving 117 downwardly) to point the nose of the flight vehicle upwardly, pointed downwardly (by moving 117 upwardly) to point the nose of the flight vehicle downwardly, pointed rightwardly (by moving 117 leftwardly) to point the nose rightwardly, pointed leftwardy (by moving 117 rightwardly) to point the nose leftwardly, rolled rightwardly to roll the flight vehicle rightwardly, rolled leftwardy to roll the flight vehicle leftwardly, pushed inwardly along its own axis to increase the throttle and pulled outwardly along its own axis to decrease the throttle.

Handle 117 can, of course, be the type shown in FIG. 1, which is a single one handed handle, or it may be of the type shown in FIG. 13 which is a combination one handed and/or a two handed handle.

For more explanation of the universality of the system reference is made to FIGS. 1, 2, 3, 14 and 15. At this point a general power control system will be described. In FIG. 15, there is shown schematically pitch, yaw, roll, throttle, and auxiliary potentiometers or rheostats 196, 197, 198, 199, and 206 respectively which are each controlled by elements 90, 95, 120, 29, and 139 respectively, in the alternative universal system. Elements 90, 95, 120, and 29 are controlled as described hereinabove and element 139 is controlled as will be described hereinafter. The movements of pitch control element 90, yaw control element 95, roll control element 120, throttle control element 29, and auxiliary control element 139 produce signals proportional thereto from their respective potentiometers or rheostats. The signals from pitch potentiometer or rheostat 196 are fed into actuator 201 (which is a well known actuator), from yaw rheostat 197 are fed into actuator 202 (which is a well known actuator), from roll rheostat 198 are fed into actuator 203 (which is a well known actuator), from throttle rheostat 199 are fed into actuator 204 (which is a well known actuator), and from auxiliary rheostat 206 are fed into actuator 205 (which is a well known actuator). Actuator 201 moves the pitch changing means 191 (which may be control surfaces, moveable jet nozzles, rotary blades etc. of flight vehicles). Actuator 202 moves the yaw changing means 192 (which may be control surfaces, movable jet nozzles, rotary blades etc. of flight vehicles). Actuator 203 moves the roll changing means 193 (which may be control surfaces, movable jet nozzles, rotary blades etc. of flight vehicles). Actuator 204 moves the throttle changing means 194. Actuator 205 moves the auxiliary changing means 195 (which may be control surfaces such as flaps, moveable jet nozzles, rotary blades etc. of flight vehicles). Of course, there could easily be more than one auxiliary system controlled from handle 117. Control 139 and element 206 may be a simple well known on-off switching arrangement as shown in FIGS. 1 and 3 (which could trigger a gun) or they may work together to form a rheostat as shown in FIG. 14 (which could actuate flaps). Linking means 207 could connect a system which is accessible to the thumb of the right hand of the pilot or to a system which is accessible to the thumb of the left hand of the pilot thereby making at least 5 separate controls possible for either hand while holding handle 117. Of course, there are a multiplicity of adaptations of this control system which are obvious to one skilled in the art which are not described herein. The wires 116 carrying the power and signals from 206 of FIGS. 14 and 15 goes through handle 117 (as shown in FIG. 14) through element 1 (as shown in FIGS. 6, 7, and 9), out the end of 1 (as shown in FIG. 1) and to actuator 205 (of FIG. 15).

Probably the most important feature of this control system is that it is readily adaptable to virtually every type of flight vehicle when used in conjunction with a servo-system, and is mechanically adaptable to virtually every type of aircraft which is small enough to not require a servo-system even if conventional control systems are used.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:
1. A single lever control assembly for multiple controlled actuations comprising:
   a housing;
   a joint allowing lateral displacement in a first direction and lateral displacement in a second direction which is perpendicular to said first direction supported by said housing;
   a sleeve means supported by said joint;
   a lever-handle control means having a control handle secured to one end thereof, extending through said sleeve means and mounted therewithin so as to be universally and slidably movable therein;
   a first and second actuator means operatively connected to said lever-handle control means along substantially said first and second directions respectively whereby displacement in said first direction of said handle controls said first actuator means and displacement in said second direction of said handle controls said second actuator means;
   a coupling means coacting with said lever-handle control means;
   a third actuator means operatively connected to said coupling means whereby rotation of said handle controls said third actuator means;
   a fourth actuator means operatively connected to said coupling means whereby axial displacement of said handle controls said fourth actuator means.
2. A single lever control assembly as set forth in claim 1, further comprising:
   a second sleeve means included as a part of said lever-handle control means extending through the first said sleeve means and having the control handle secured to one end thereof;
   a switch means secured to said handle;
   a fifth actuator means;
   an electrical conductor means connected between said switch means and said fifth actuator means for control thereof responsive to manipulation of said switch, said conductor means being inserted within said second sleeve means.
3. A single lever control assembly as set forth in claim 1, wherein said first, second and third actuator means include flexible transmitting members;
   constant tension means operatively connected to said respective flexible members for sustaining a predetermined tension therein.
4. A single lever control assembly for multiple controlled actuations comprising:
   a housing;
   a universal joint supported by said housing;
   a lever-handle control means having a control handle secured to one end thereof, extending through said joint and mounted therewithin so as to be universally movable therein;
   a first and second actuator means operatively connected to said lever-handle control means along substantially a first direction and a second direction which is perpendicular to said first direction respectively whereby displacement in said first direction of said handle controls said first actuator means and displacement in said second direction of said handle controls said second actuator means;
   a coupling means coacting with said lever-handle control means;
   a third actuator means operatively connected to said coupling means whereby rotation of said handle controls said third actuator means.
5. A single lever control assembly as set forth in claim 4, further comprising:
   a sleeve means included as a part of said lever-handle control means extending through the universal joint and having the control handle secured to one end thereof;

a switch means secured to said handle;
a fourth actuator means;
an electrical conductor means connected between said switch means and said fourth actuator means for control thereof responsive to manipulations of said switch, said conductor means being inserted within said sleeve means.

6. The single lever control assembly as set forth in claim 4, wherein said first, second and third actuator means include flexible transmitting members;
constant tension means operatively connected to said respective flexible members for sustaining a predetermined tension therein.

7. A single lever control assembly for multiple controlled actuations comprising:
a housing;
a joint allowing lateral displacement supported by said housing;
a sleeve means supported by said joint;
a lever-handle control means having a control handle secured to one end thereof, extending through said sleeve means and mounted therewithin so as to be rotatably, laterally, and slidably movable therein;
a first actuator means operatively connected to said lever-handle control means along a lateral path whereby lateral displacement of said handle controls said first actuator means;
a coupling means coacting with said lever-handle control means;
a second actuator means operatively connected to said coupling means whereby rotation of said handle controls said second actuator means;
a third actuator means operatively connected to said coupling means whereby axial displacement of said handle controls said third actuator means.

8. A single lever control assembly as set forth in claim 7, further comprising:
a second sleeve means included as a part of said lever-handle control means extending through the first said sleeve means and having the control handle secured to one end thereof;
a switch means secured to said handle;
a fourth actuator means;
an electrical conductor means connected between said switch means and said fourth actuator means for control thereof responsive to manipulation of said switch, said conductor means being inserted within said second sleeve means.

9. A single lever control assembly as set forth in claim 7, wherein said first and second actuator means include flexible transmitting members;
constant tension means operatively connected to said respective flexible members for sustaining a predetermined tension therein.

10. A single lever control assembly for multiple controlled actuations comprising:
a housing;
a universal joint supported by said housing;
a lever-handle control means having a control handle secured to one end thereof, extending through said joint and mounted therewithin so as to be universally movable therein;
a first and second actuator means operatively connected to said lever-handle control means along substantially a first direction and a second direction which is perpendicular to said first direction respectively with said universal joint intermediate said control handle and said first and second actuator means whereby displacement in said first direction of said handle controls said first actuator means and displacement in said second direction of said handle controls said second actuator means;
a coupling means coacting with said lever-handle control means with said universal joint intermediate said control handle and said coupling means;
a third actuator means operatively connected to said coupling means whereby rotation of said handle controls said third actuator means.

11. A single lever control assembly for multiple controlled actuations comprising:
a housing;
a joint allowing lateral displacement supported by said housing;
a sleeve means supported by said joint and extending through said joint;
a lever-handle control means having a control handle secured to one end thereof, extending through said sleeve means and mounted therewithin so as to be rotatably, laterally, and slidably movable therein;
a first actuator means operatively connected to said lever-handle control means along a lateral path with said joint intermediate said control handle and said actuator means whereby lateral displacement of said handle controls said first actuator means;
a coupling means coacting with said lever-handle control means with said joint intermediate said control handle and said coupling means;
a second actuator means operatively connected to said coupling means whereby rotation of said handle controls said second actuator means;
a third actuator means operatively connected to said coupling means whereby axial displacement of said handle controls said third actuator means.

References Cited
UNITED STATES PATENTS 3,266,523   8/1966   Stevens _____ 74—471 X MILTON KAUFMAN, *Primary Examiner.*